United States Patent
Yoo et al.

(10) Patent No.: US 10,011,710 B2
(45) Date of Patent: Jul. 3, 2018

(54) FLAME RETARDANT THERMOPLASTIC RESIN COMPOSITION HAVING SUPERIOR THERMAL STABILITY, METHOD OF PREPARING THE SAME, AND MOLDED ARTICLE MANUFACTURED FROM THE SAME

(71) Applicant: LG CHEM, LTD., Seoul (KR)

(72) Inventors: Je Sun Yoo, Daejeon (KR); Ki Young Nam, Daejeon (KR); Yong Yeon Hwang, Daejeon (KR); Jae Young Sim, Daejeon (KR); Seon Hyeong Bae, Daejeon (KR); Jae Yeon Bae, Daejeon (KR); In Seok Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 15/533,973

(22) PCT Filed: Oct. 18, 2016

(86) PCT No.: PCT/KR2016/011712
§ 371 (c)(1),
(2) Date: Jun. 7, 2017

(87) PCT Pub. No.: WO2017/069499
PCT Pub. Date: Apr. 27, 2017

(65) Prior Publication Data
US 2017/0342254 A1    Nov. 30, 2017

(30) Foreign Application Priority Data
Oct. 23, 2015 (KR) .................. 10-2015-0147787

(51) Int. Cl.
*C08L 25/12* (2006.01)

(52) U.S. Cl.
CPC .......... *C08L 25/12* (2013.01); *C08L 2201/02* (2013.01)

(58) Field of Classification Search
CPC ............................ C08L 25/12; C08L 2201/02
See application file for complete search history.

(56) References Cited

U.S. PATENT DOCUMENTS

| | | | | |
|---|---|---|---|---|
| 2013/0178564 A1* | 7/2013 | Yoo | ......................... | C08L 25/12 524/101 |
| 2014/0094556 A1* | 4/2014 | Ahn | ...................... | C08F 279/04 524/504 |
| 2014/0249272 A1* | 9/2014 | Ogasawara | ............... | C08F 2/24 524/819 |

FOREIGN PATENT DOCUMENTS

| CN | 101684194 A | 3/2010 |
|---|---|---|
| KR | 10-0225796 B1 | 10/1999 |
| KR | 10-2011-0077121 A | 7/2011 |
| KR | 10-2012-0029525 A | 3/2012 |
| KR | 10-2013-0079175 A | 7/2013 |
| WO | WO 2015/016520 A1 | 2/2015 |

OTHER PUBLICATIONS

Asua, J.M.; Polymeric Dispersions: Principles and Applications, 1997, p. 463-476 (Year: 1997).*
Aramendia, E. et al; Journal of Polymer Science Part A: Polymer Chemistry, 2004, p. 4202-4211 (Year: 2004).*
International Search Report for PCT/KR2016/011712 filed on Oct. 18, 2016.

* cited by examiner

*Primary Examiner* — Robert S Jones, Jr.

(57) ABSTRACT

The present disclosure relates to a flame retardant thermoplastic resin composition having superior thermal stability, and a molded article manufactured from the same. More particularly, the present disclosure provides a flame retardant thermoplastic resin composition exhibiting both superior thermal stability and flame retardancy without harmful gas generation even when injection-molded at high temperature, high pressure, and high speed and a molded article manufactured from the same.

15 Claims, No Drawings

FLAME RETARDANT THERMOPLASTIC RESIN COMPOSITION HAVING SUPERIOR THERMAL STABILITY, METHOD OF PREPARING THE SAME, AND MOLDED ARTICLE MANUFACTURED FROM THE SAME

CROSS-REFERENCE TO RELATED APPLICATION(S)

This application is a U.S. national stage of PCT/KR2016/011712 filed Oct. 18, 2016,which claims the priority benefit of Korean Patent Application No. 10-2015-0147787, filed on Oct. 23, 2015 in the Korean Intellectual Property Office, the disclosures of which are incorporated herein by reference.

TECHNICAL FIELD

The present disclosure relates to a flame retardant thermoplastic resin composition having superior thermal stability, a method of preparing the same, and a molded article manufactured from the same. More particularly, the present invention relates to a flame retardant thermoplastic resin composition exhibiting both superior thermal stability and flame retardancy without harmful gas generation even when injection-molded at high temperature, high pressure, and high speed and a molded article manufactured from the same.

BACKGROUND ART

An acrylonitrile-butadiene-styrene (hereinafter referred to as ABS) resin has been widely used as an exterior material for electrical and electronic products, office equipment, and the like due to stiffness and chemical resistance of acrylonitrile and processability and mechanical strength of butadiene and styrene. However, since ABS resins readily combust, flame retardancy is hardly provided.

As methods of imparting flame retardancy to an ABS resin, there are a method of including a flame retardant monomer when polymerization is performed to prepare a rubber-modified styrene based resin, a method of mixing a prepared rubber-modified styrene based resin with a flame retardant and a flame retardant aid, and the like. Examples of the flame retardant include halogen-based flame retardants and non-halogen-based flame retardants such as phosphorus-based flame retardants. Examples of the flame retardant aid include antimony-based compounds, zinc-based compounds, polysiloxane-based compounds, and the like.

However, since residual emulsifier in an ABS resin accelerates decomposition of a flame retardant, generation of TVOCs, tribromophenol, etc. increases and retention stability is rapidly decreased. In addition, although a bromine-based flame retardant, which is mainly used among halogen-based flame retardants, exhibits superior flame retardancy, the bromine-based flame retardant generates gas and thermal stability thereof is decreased when injection-molded at high temperature, high pressure, and high speed.

RELATED ART DOCUMENT

[Patent Document] KR 0225796 B1

DISCLOSURE

Technical Problem

Therefore, the present invention has been made in view of the above problems, and it is one object of the present invention to provide a flame retardant thermoplastic resin composition having superior thermal stability, a method of preparing the same, and a molded article manufactured from the same. More particularly, the present invention relates to a flame retardant thermoplastic resin composition exhibiting both superior thermal stability and flame retardancy without harmful gas generation even when injection-molded at high temperature, high pressure, and high speed and a molded article manufactured from the same.

The above and other objects can be accomplished by the present disclosure described below.

Technical Solution

In accordance with an aspect of the present invention, the above and other objects can be accomplished by the provision of a flame retardant thermoplastic resin composition including 100 parts by weight of a base resin (A) that includes 10 to 90% by weight of an aromatic vinyl compound-conjugated diene compound-aromatic vinyl compound copolymer graft-polymerized with a reactive emulsifier and 10 to 90% by weight of an aromatic vinyl compound-vinyl cyan compound copolymer; 1 to 30 parts by weight of a bromine-based flame retardant (B); 0.5 to 8 parts by weight of an antimony-based compound (C); and 0.1 to 5 parts by weight of a polyol compound (D) and thus exhibiting superior thermal stability, and a method of preparing the same.

In accordance with another aspect of the present invention, there is provided a molded article manufactured from the flame retardant thermoplastic resin composition having superior thermal stability.

Advantageous Effects

As apparent from the fore-going, the present invention provides a flame retardant thermoplastic resin composition exhibiting both superior thermal stability and flame retardancy without gas generation even when injection-molded at high temperature, high pressure, and high speed harmful due to reduction of a residual emulsifier content, a method of preparing the same, and a molded article manufactured from the same.

BEST MODE

Hereinafter, the present invention is described in detail.

A flame retardant thermoplastic resin composition of the present disclosure includes 100 parts by weight of a base resin (A) that includes 10 to 90% by weight of an aromatic vinyl compound-conjugated diene compound-aromatic vinyl compound copolymer graft-polymerized with a reactive emulsifier and 10 to 90% by weight of an aromatic vinyl compound-vinyl cyan compound copolymer; 1 to 30 parts by weight of a bromine-based flame retardant (B); 0.5 to 8 parts by weight of an antimony-based compound (C); and 0.1 to 5 parts by weight of a polyol compound (D). Within this range, both superior thermal stability and flame retardancy are exhibited without generation of harmful gas even when injection-molded at high temperature, high pressure, and high speed.

Hereinafter, constituents of the flame retardant thermoplastic resin composition of the present disclosure are described in detail.

Base Resin (A)

The base resin may include 25 to 35% by weight of an aromatic vinyl compound-conjugated diene compound-aromatic vinyl compound copolymer graft-polymerized with a reactive emulsifier and 65 to 75% by weight of an aromatic vinyl compound-vinyl cyan compound copolymer. Within this range, superior impact strength and property balance are exhibited.

The reactive emulsifier may be, for example, one or more selected from the group consisting of sulfoethyl methacrylate, 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfate, sodium polyoxy alkyl ether sulfuric ester, alkenyl $C_{16}$ to $C_{18}$ succinic acid, di-potassium salt, and sodium methallyl sulfonate. Within this range, both superior thermal stability and flame retardancy are exhibited without generation of harmful gas even when injection-molded at high temperature, high pressure, and high speed.

The reactive emulsifier may be included, for example, in an amount of 0.001 to 2 parts by weight, 0.01 to 1.5 parts by weight, or 0.1 to 1.0 parts by weight based on 100 parts by weight of the aromatic vinyl compound-conjugated diene compound-aromatic vinyl compound copolymer. Within this range, latex is stabilized, the amount of a residual emulsifier is reduced, and generation of TVOCs is suppressed.

Bromine-Based Flame Retardant (B)

The amount of the bromine-based flame retardant (B) may be, for example, 10 to 27 parts by weight, or 15 to 25 parts by weight. Within this range, superior flame retardancy and property balance are provided.

The bromine-based flame retardant (B) may be, for example, one or more selected from the group consisting of hexabromocyclododecan, tetrabromocyclooctane, monochloropentabromocyclohexane, decabromodiphenyl oxide, octabromodiphenyloxide, decabromodiphenyl ethane, ethylene bis(tetrabromophthalimide), tetrabromobisphenol A, brominated epoxy oligomer, bis(tribromophenoxy)ethane, tris(tribromophenyl) cyanurate, tetrabromobisphenol A bis (allyl ether), and derivative thereof.

Antimony-Based Compound (C)

When the antimony-based compound is used with a bromine-based flame retardant, flame retardancy of the flame retardant thermoplastic resin composition is greatly improved due to a synergy effect.

The amount of the antimony-based compound (C) may be, for example, 1 to 7 parts by weight, or 2 to 6 parts by weight. Within this range, flame retardancy further increases.

The antimony-based compound (C) may be, for example, one or more selected from the group consisting of antimony trioxide, antimony pentoxide, metal antimony, and antimony trichloride.

Polyol Compound (D)

The amount of the polyol compound (D) may be, for example, 0.1 to 3 parts by weight, or 0.2 to 1 part by weight. Within this range, the amount of a residual emulsifier is reduced and superior thermal stability is provided.

The polyol compound (D) may be, for example, a compound containing two or more alcohol groups, or two to twenty alcohol groups; or a polyvinyl alcohol resin. As particular examples, the compound containing two or more alcohol groups may be one or more selected from the group consisting of butanediol, hexanediol, glycerol, adamantanol, sorbitol, galactitol, mannitol, arabinitol, xylitol, adonitol, and pentaerythritol. Within this range, the amount of a residual emulsifier is reduced and superior thermal stability is provided.

The flame retardant thermoplastic resin composition may include, for example, 0.01 to 10 parts by weight, or 1 to 5 parts by weight of a total of a lubricant, a heat stabilizer, and an anti-dripping agent. Within this range, superior property balance is provided.

The flame retardant thermoplastic resin composition may further include, for example, one or more selected from the group consisting of an impact modifier, an antioxidant, a light stabilizer, a sunscreen, a pigment, and an inorganic filler.

The flame retardant thermoplastic resin composition may have, for example, a gloss retention ($\Delta G$) of 10 or less, 8 or less or 2 to 7 or less.

A tribromophenol (TBP) content in the flame retardant thermoplastic resin composition may be, for example, 3% or less, or 1 to 2.5% or less.

A residual emulsifier content in the flame retardant thermoplastic resin composition may be, for example, less than 18000 ppm, 15000 ppm or less, or 1500 to 14000 ppm. Within this range, superior thermal stability and flame retardancy are exhibited.

The flame retardant thermoplastic resin composition may have, for example, a retention discoloration ($\Delta E$) of 8 or less, or 4 to 7.

The flame retardant thermoplastic resin composition may have, for example, a TGA loss rate (230° C., 30 min) of 3 or less, or 1.5 to 2.5.

A method of preparing the flame retardant thermoplastic resin of the present disclosure may include a step of melt-kneading and then extruding 100 parts by weight of a base resin (A) that includes 10 to 90% by weight of an aromatic vinyl compound-conjugated diene compound-aromatic vinyl compound copolymer graft-polymerized with a reactive emulsifier and 10 to 90% by weight of an aromatic vinyl compound-vinyl cyan compound copolymer; 1 to 30 parts by weight of a bromine-based flame retardant (B); 0.5 to 8 parts by weight of an antimony-based compound (C); and 0.1 to 5 parts by weight of a polyol compound (D).

The melt-kneadingn may be carried out, for example, at 210 to 250° C., or 220 to 240° C.

The present disclosure also provides a molded article manufactured from the flame retardant thermoplastic resin composition.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Compounds used in examples and comparative examples below are as follows:

ABS-1: Prepared by polymerizing 0.2 parts by weight of a reactive emulsifier, alkenyl $C_{16-18}$ succinate potassium salt (Eloplas AS100).

ABS-2: Prepared by polymerizing 0.2 parts by weight of a reactive emulsifier, sodium dodecyl allyl sulfosuccinate (TREMLF-40).

ABS-3: Prepared by polymerizing 0.2 parts by weight of a reactive emulsifier, dipotassium salt (Latemul ASK).

ABS-4: Prepared by polymerizing 0.2 parts by weight of a general emulsifier, fatty acid soap.

SAN resin: Including 24% by weight of acrylonitrile and 76% by weight of styrene.
Bromine-based flame retardant: Tris(tribromophenol) cyanurate
Antimony-based compounds: Antimony trioxide
Polyol compound-1: Pentaerythritol
Polyol compound-2: Xylitol
Polyol compound-3: Sorbitol
Lubricant: Ethylene bis stearate
Heat stabilizer: IR1076 (Ciba Geigy)
Anti-dripping agent: CD145E (Ashahi kasei)

Examples 1 to 6 and Comparative Examples 1 to 4

Ingredients were added in contents as summarized in Table 1 below and mixed. Each of resultant mixtures was extruded by means of a twin-screw extruder at 230° C. and then prepared into a pellet. The prepared pellet was injection-molded to a specimen for testing properties.

TEST EXAMPLE

The characteristics of a flame retardant thermoplastic resin prepared according to each of Examples 1 to 6 and Comparative Examples 1 to 4 were measured according to the following methods. Results are summarized in Table 2 below.
Residual emulsifier (ppm): 0.2 g of a resin was exactly fed into a 50 ml vial. 10 ml of acetone was added thereto, and sonication was performed for two hours such that a sample was dissolved. Subsequently, 30 ml of methanol was slowly added to the vial to precipitate a polymer. Ultrasonication was performed for 1 hour and additives were extracted. A supernatant was collected and then filtered. The content of a residual emulsifier content was measured using HPLC/DAD/MSD (Agilent 1100 system).
Impact strength (¼", kgf·cm/cm): Measured according to ASTM D256.
Surface gloss)(45°): The surface gloss of a specimen was measured at 45° according to ASTM D528.
Retention discoloration (ΔE): A pellet obtained from an extruder was fed into an injection molding machine and was allowed to sit in a 250° C. cylinder for 15 minutes, thereby obtaining a glossy specimen. In the same manner, a glossy specimen was obtained through continuous injection molding at 200° C. A color value, an LAB value, of each of obtained specimens was measured by means of a HunterLab colorimeter. ΔE refers to an arithmetic mean before and after retention. Retention stability is superior as ΔE is close to 0.

$$\Delta E = \sqrt{\{(L-L')^2 + (a-a')^2 + (b-b')^2\}}$$ [Mathematical Equation 1]

Gloss retention ( ): Specimens were manufactured as in the retention discoloration test to obtain a gloss deviation value. Retention stability is superior as ΔG is small.
Tribromophenol (TBP) content (%): Extrusion was performed at 220° C., and the content of TBP generated in a pellet was measured by LC. Pyrolysis of a flame retardant is decreased as the TBP content is small.
TGA loss rate (%): Heating loss was isothermally performed at 230° C. for 30 min to measure a reduced mass. Thermal stability is superior as the TGA loss rate is small.
TVOCs (ppm): Measured using gas chromatography.
Flame retardancy: Measured by performing the UL94 test method that is a standard flame retardancy evaluation method characterized by dividing into V-0, V-1 and V-2 grades according to a vertical combustion test method.

TABLE 1

| Classification | Examples | | | | | | Comparative Examples | | | |
|---|---|---|---|---|---|---|---|---|---|---|
| | 1 | 2 | 3 | 4 | 5 | 6 | 1 | 2 | 3 | 4 |
| ABS-1 | 30 | | | 30 | 30 | 30 | | 30 | | 30 |
| ABS-2 | | 30 | | | | | | | | |
| ABS-3 | | | 30 | | | | | | | |
| ABS-4 | | | | | | | 30 | | 30 | |
| SAN | 70 | 70 | 70 | 70 | 70 | 70 | 70 | 70 | 70 | 70 |
| Flame retardant | 22 | 22 | 22 | 22 | 22 | 22 | 22 | 22 | 22 | 22 |
| Antimony trioxide | 4 | 4 | 4 | 4 | 4 | 4 | 4 | 4 | 4 | 4 |
| Polyol-1 | 0.5 | 0.5 | 0.5 | 0.2 | | | | | 0.5 | 10 |
| Polyol-2 | | | | | 0.5 | | | | | |
| polyol-3 | | | | | | 0.5 | | | | |
| Lubricant | 1 | 1 | 1 | 1 | 1 | 1 | 1 | 1 | 1 | 1 |
| Heat stabilizer | 0.4 | 0.4 | 0.4 | 0.4 | 0.4 | 0.4 | 0.8 | 0.4 | 0.4 | 0.4 |
| Anti-dripping agent | 0.1 | 0.1 | 0.1 | 0.1 | 0.1 | 0.1 | 0.1 | 0.1 | 0.1 | 0.1 |

TABLE 2

| Classification | Examples | | | | | | Comparative Examples | | | |
|---|---|---|---|---|---|---|---|---|---|---|
| | 1 | 2 | 3 | 4 | 5 | 6 | 1 | 2 | 3 | 4 |
| Residual emulsifier | 15000 | 14000 | 14500 | 14000 | 14000 | 15000 | 24000 | 18000 | 25000 | 17000 |
| Impact strength | 16.1 | 16.0 | 16.3 | 15.9 | 17.2 | 16.5 | 14.2 | 15.3 | 13.6 | 5.4 |

TABLE 2-continued

|  | Examples | | | | | | Comparative Examples | | | |
|---|---|---|---|---|---|---|---|---|---|---|
| Classification | 1 | 2 | 3 | 4 | 5 | 6 | 1 | 2 | 3 | 4 |
| Surface gloss | 104 | 105 | 105 | 107 | 105 | 104 | 99 | 102 | 98 | 82 |
| Retention discoloration | 7.5 | 7.0 | 7.7 | 7.9 | 6.5 | 6.4 | 11.6 | 9.5 | 9.3 | 18.9 |
| Gloss retention | 4.2 | 5.4 | 4.7 | 5.0 | 6.8 | 5.9 | 15.2 | 14.8 | 15.7 | 14.2 |
| TBP content | 2.2 | 2.1 | 2.0 | 2.4 | 2.1 | 1.7 | 5.5 | 4.4 | 4.1 | 1.2 |
| TGA loss rate | 1.8 | 2.1 | 2.0 | 1.9 | 2.1 | 2.3 | 4.2 | 3.8 | 4.7 | 9.8 |
| TVOCs Acrylonitrile | 7 | 8 | 7 | 9 | 7 | 9 | 34 | 15 | 34 | 9 |
| Toluene | 49 | 44 | 47 | 49 | 45 | 44 | 51 | 50 | 51 | 42 |
| Ethyl benzene | 110 | 117 | 112 | 109 | 117 | 113 | 102 | 110 | 107 | 120 |
| Styrene | 568 | 572 | 557 | 559 | 570 | 555 | 1002 | 678 | 997 | 611 |
| α-methyl styrene | 197 | 207 | 201 | 180 | 189 | 207 | 214 | 197 | 220 | 221 |
| Acetophenone | 129 | 114 | 127 | 121 | 124 | 119 | 142 | 140 | 135 | 132 |
| TDDM | 4.2 | 4.7 | 4.2 | 4.7 | 4.7 | 7.3 | 60.7 | 7.8 | 72 | 5.6 |
| Flame retardancy | V-0 | V-0 | V-0 | V-0 | V-0 | V-0 | V-1 | V-0 | V-0 | V-0 |

As shown in Table 2, it can be confirmed that, in the cases of Examples 1 to 6 according to the method of the present disclosure, the content of a residual emulsifier, a TBP content, a TGA loss rate, and generation of TVOCs are remarkably decreased, impact strength is superior, and thermal stability-related properties, such as surface gloss, retention discoloration, and gloss retention, are improved.

On the other hand, it can be confirmed that, in the cases of Comparative Examples 1 and 3 in which an ABS resin polymerized with a general emulsifier is included, the amount of a residual emulsifier, a TBP content, a TGA loss rate, and generation of TVOCs greatly increase.

In addition, it can be confirmed that, in the case of Comparative Example 2 in which a polyol compound is not included, thermal stability-related properties, such as surface gloss, retention discoloration, and gloss retention, are deteriorated. Further, it can be confirmed that, in the case of Comparative Example 4 in which a large amount of polyol compound is included, impact strength and thermal stability are decreased.

The invention claimed is:

1. A flame retardant thermoplastic resin composition, comprising:
   100 parts by weight of a base resin (A) that comprises 10 to 90% by weight of an aromatic vinyl compound-conjugated diene compound-aromatic vinyl compound copolymer graft-polymerized with a reactive emulsifier and 10 to 90% by weight of an aromatic vinyl compound-vinyl cyan compound copolymer;
   1 to 30 parts by weight of a bromine-based flame retardant (B);
   0.5 to 8 parts by weight of an antimony-based compound (C); and
   0.1 to 5 parts by weight of a polyol compound (D).

2. The flame retardant thermoplastic resin composition according to claim 1, wherein the reactive emulsifier is one or more selected from the group consisting of sulfoethyl methacrylate, 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfate, sodium polyoxy alkyl ether sulfuric ester, alkenyl $C_{16}$ to $C_{18}$ succinic acid, di-potassium salt, and sodium methallyl sulfonate.

3. The flame retardant thermoplastic resin composition according to claim 1, wherein the reactive emulsifier is comprised in an amount of 0.001 to 2 parts by weight based on 100 parts by weight of the aromatic vinyl compound-conjugated diene compound-aromatic vinyl compound copolymer.

4. The flame retardant thermoplastic resin composition according to claim 1, wherein the bromine-based flame retardant (B) is one or more selected from the group consisting of hexabromocyclododecan, tetrabromocyclooctane, monochloropentabromocyclohexane, decabromodiphenyl oxide, octabromodiphenyloxide, decabromodiphenyl ethane, ethylene bis(tetrabromophthalimide), tetrabromobisphenol A, brominated epoxy oligomer, bis(tribromophenoxy)ethane, tris(tribromophenyl) cyanurate, tetrabromobisphenol A bis(allyl ether), and derivative thereof.

5. The flame retardant thermoplastic resin composition according to claim 1, wherein the antimony-based compound (C) is one or more selected from the group consisting of antimony trioxide, antimony pentoxide, metal antimony, and antimony trichloride.

6. The flame retardant thermoplastic resin composition according to claim 1, wherein the polyol compound (D) is a compound containing two or more alcohol groups, or a polyvinyl alcohol resin.

7. The flame retardant thermoplastic resin composition according to claim 6, wherein the compound containing two or more alcohol groups is one or more selected from the group consisting of butanediol, hexanediol, glycerol, adamantanol, sorbitol, galactitol, mannitol, arabinitol, xylitol, adonitol, and erythritol.

8. The flame retardant thermoplastic resin composition according to claim 1, wherein the flame retardant thermoplastic resin composition further comprises 0.01 to 10 parts by weight of a total of a lubricant, a heat stabilizer, and an anti-dripping agent.

9. The flame retardant thermoplastic resin composition according to claim 1, wherein the flame retardant thermoplastic resin composition further comprises one or more selected from the group consisting of an impact modifier, an antioxidant, a light stabilizer, a sunscreen, a pigment, and an inorganic filler.

10. The flame retardant thermoplastic resin composition according to claim 1, wherein the flame retardant thermoplastic resin composition has a gloss retention (ΔG) of 10 or less.

11. The flame retardant thermoplastic resin composition according to claim 1, wherein a tribromophenol (TBP) content in the flame retardant thermoplastic resin composition is 3% or less.

12. The flame retardant thermoplastic resin composition according to claim 1, wherein the flame retardant thermoplastic resin composition has a retention discoloration (ΔE) of 8 or less.

13. The flame retardant thermoplastic resin composition according to claim 1, wherein the flame retardant thermoplastic resin composition has a TGA loss rate (230° C., 30 min) of 3 or less.

14. A method of preparing a flame retardant thermoplastic resin composition, the method comprising a step of melt-kneading and then extruding 100 parts by weight of a base resin (A) that comprises 10 to 90% by weight of an aromatic vinyl compound-conjugated diene compound-aromatic vinyl compound copolymer graft-polymerized with a reactive emulsifier and 10 to 90% by weight of an aromatic vinyl compound-vinyl cyan compound copolymer; 1 to 30 parts by weight of a bromine-based flame retardant (B); 0.5 to 8 parts by weight of an antimony-based compound (C); and 0.1 to 5 parts by weight of a polyol compound (D).

15. A molded article manufactured from the flame retardant thermoplastic resin composition according to claim 1.

* * * * *